US012157213B2

(12) United States Patent
Oh

(10) Patent No.: US 12,157,213 B2
(45) Date of Patent: Dec. 3, 2024

(54) NAIL GUN HAVING ACCIDENTAL SHOOTING PREVENTION STRUCTURE

(71) Applicant: Jeil Tacker Co., Ltd., Gwangju (KR)

(72) Inventor: Wang-Geun Oh, Gwangju (KR)

(73) Assignee: Jeil Tacker Co., Ltd., Gwangju (KR)

( * ) Notice: Subject to any disclaimer, the term of this patent is extended or adjusted under 35 U.S.C. 154(b) by 126 days.

(21) Appl. No.: 18/166,539

(22) Filed: Feb. 9, 2023

(65) Prior Publication Data

US 2024/0269811 A1 Aug. 15, 2024

(51) Int. Cl.
*B25C 1/00* (2006.01)
*B25C 1/04* (2006.01)

(52) U.S. Cl.
CPC .............. *B25C 1/008* (2013.01); *B25C 1/047* (2013.01)

(58) Field of Classification Search
CPC ................................ B25C 1/008; B25C 1/047
See application file for complete search history.

(56) References Cited

U.S. PATENT DOCUMENTS 8,104,658 B2 * 1/2012 Yu ......................... B25C 5/1665 227/8
2009/0159633 A1 * 6/2009 Wu ......................... B25C 1/008 227/8

* cited by examiner

*Primary Examiner* — Praachi M Pathak
(74) *Attorney, Agent, or Firm* — Ryuh Patent Law; Steven Yu

(57) ABSTRACT

Disclosed is a nail gun having an accidental shooting prevention structure. More particularly, the nail gun having an accidental shooting prevention structure has a function of controlling not to be shot when not loaded or continuously driven except when a nose of a contact member is pressed to a target object and, at the same time, a trigger is pulled.

10 Claims, 8 Drawing Sheets

[FIG.1]
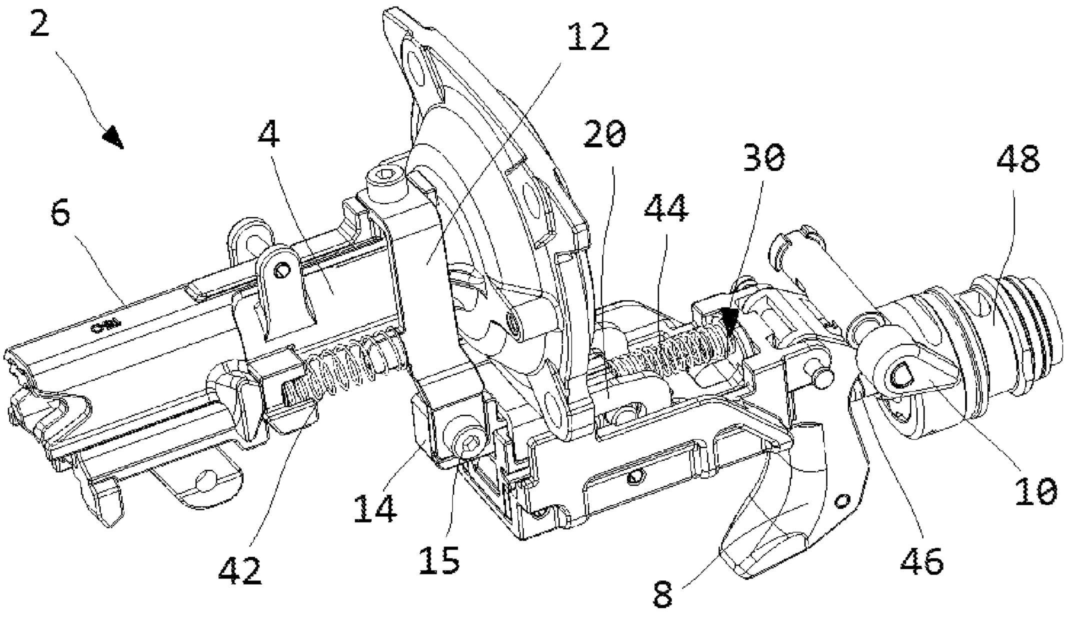

[FIG.2]
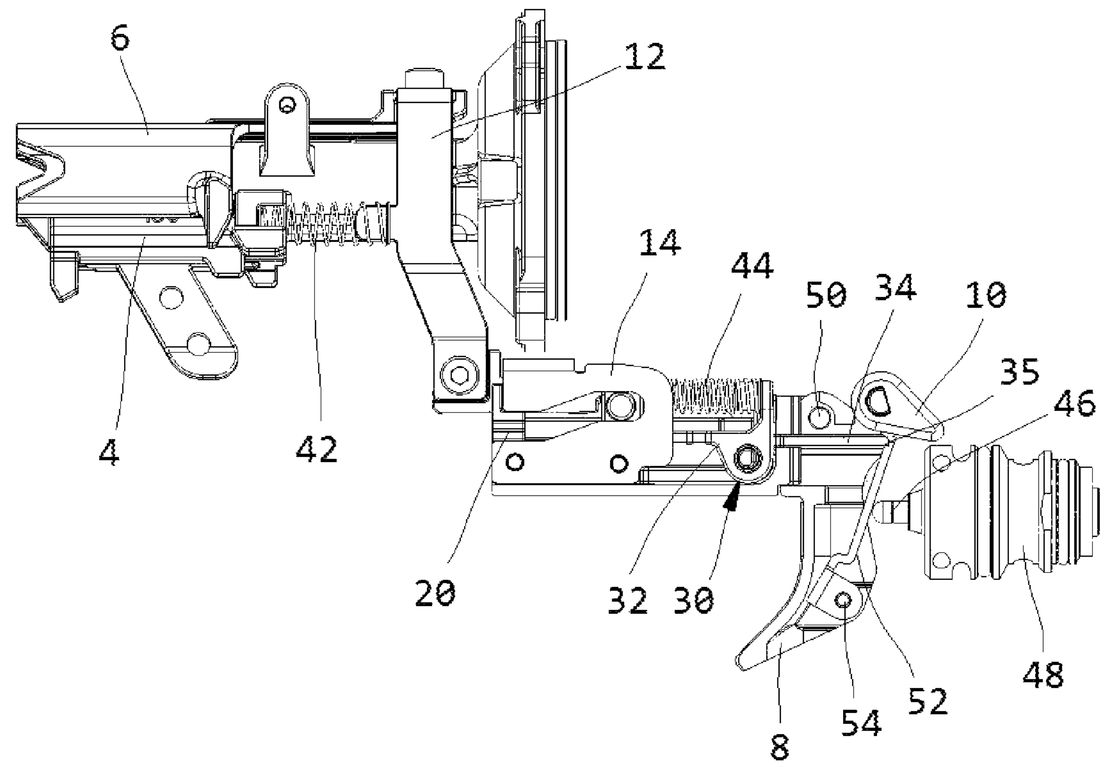

[FIG.3]
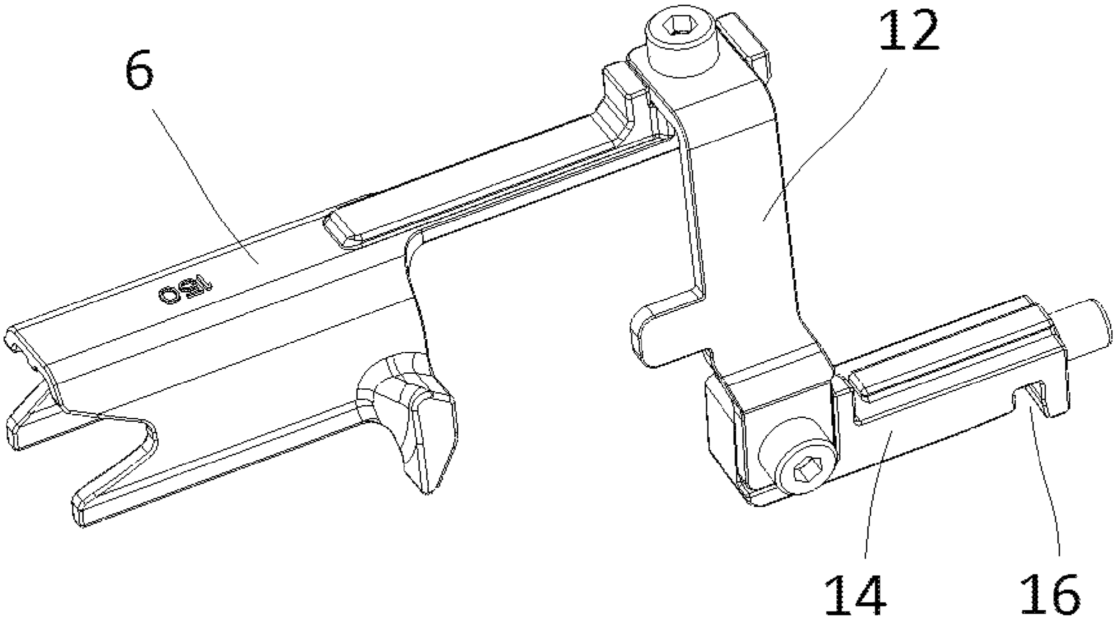

[FIG.4]
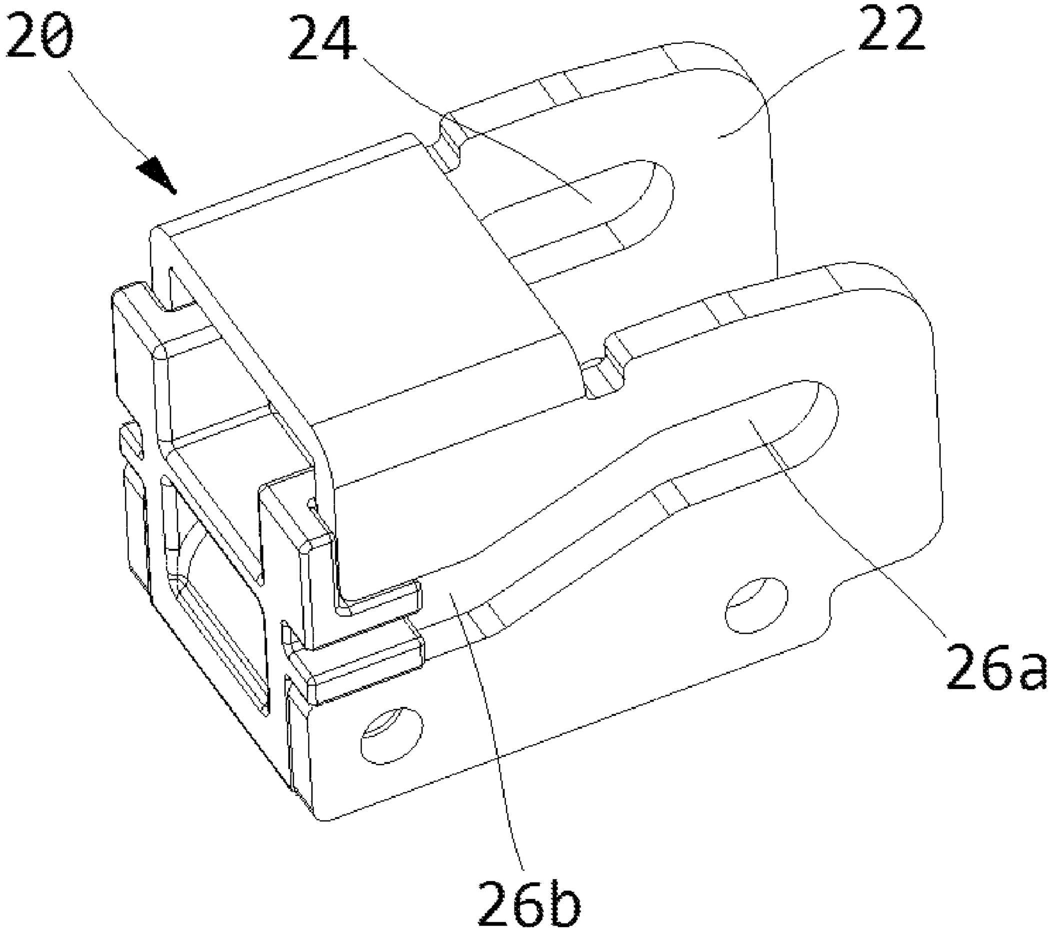

[FIG.5]
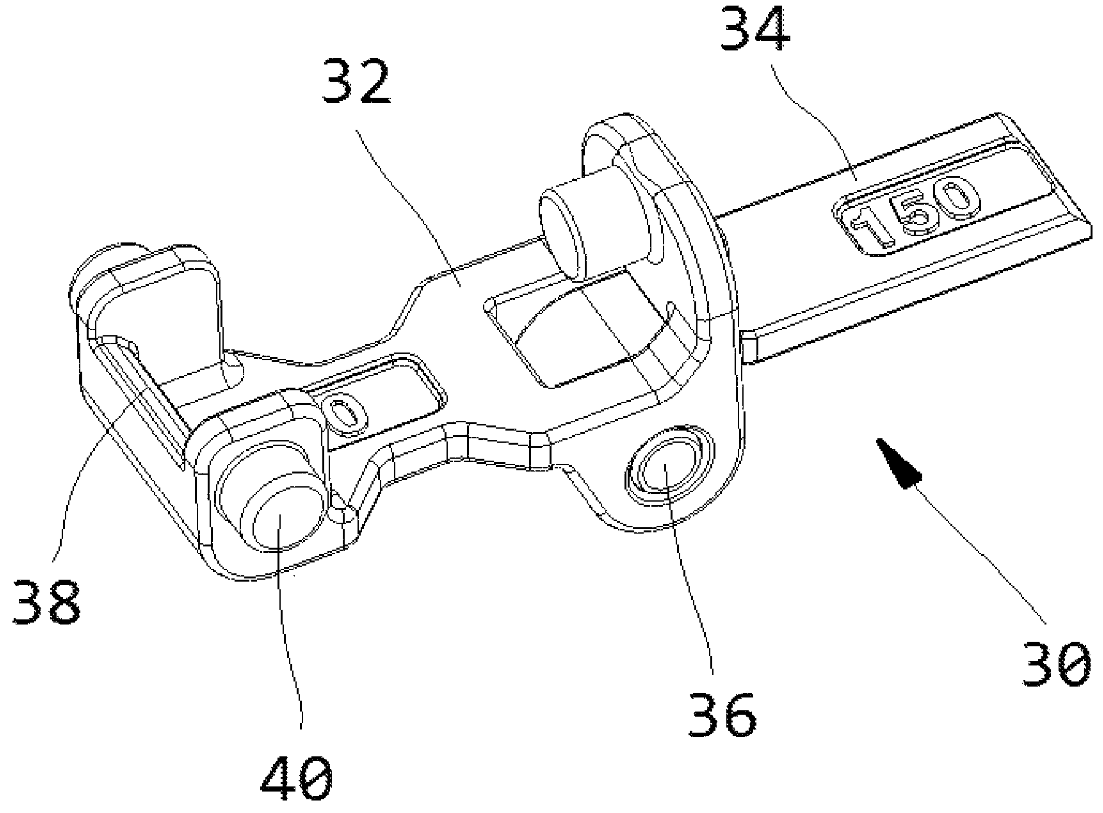

[FIG.6]
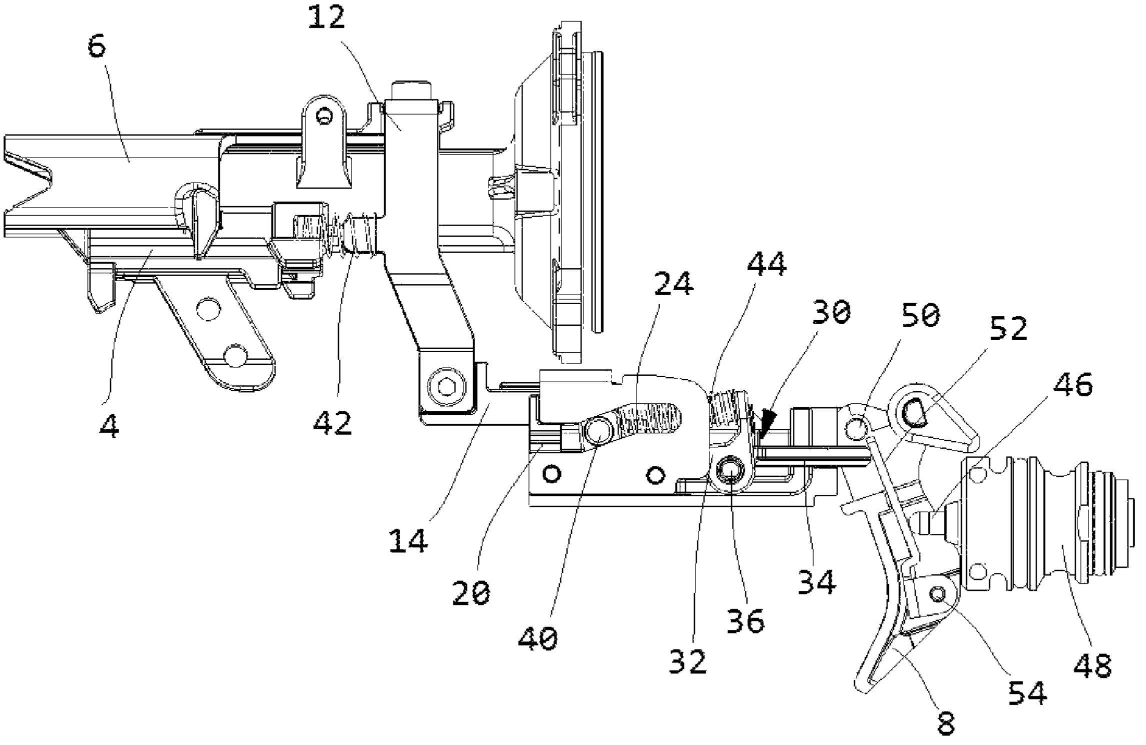

[FIG.7]
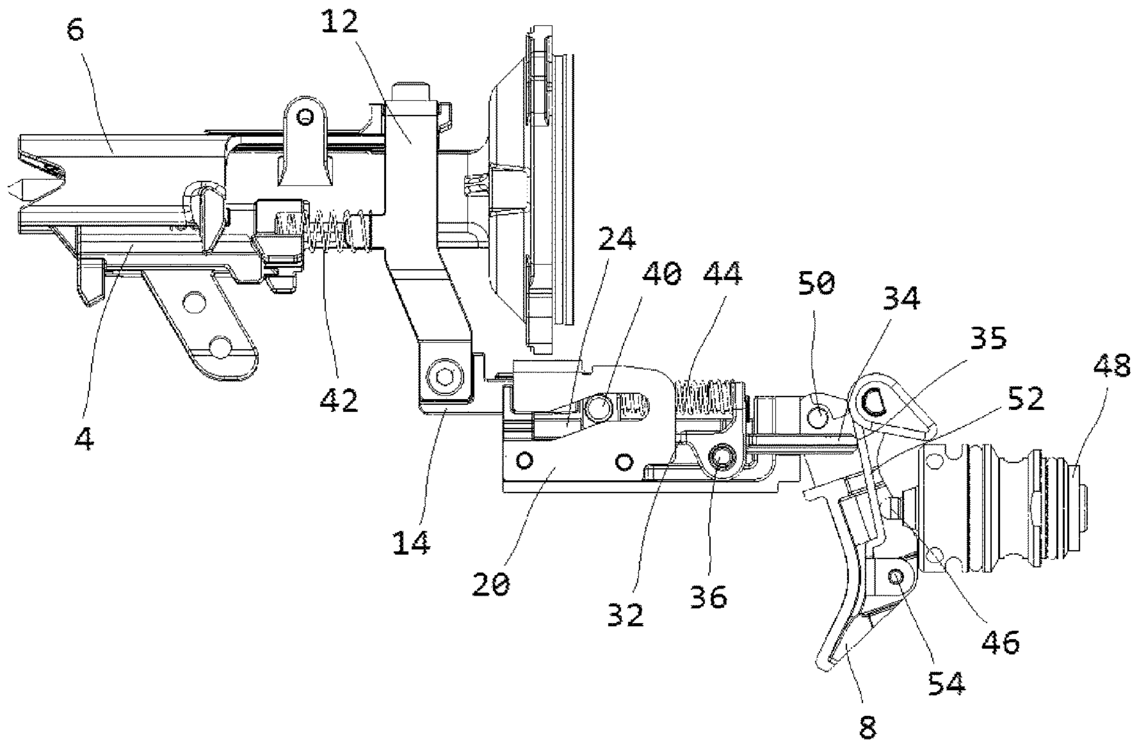
[FIG.8]
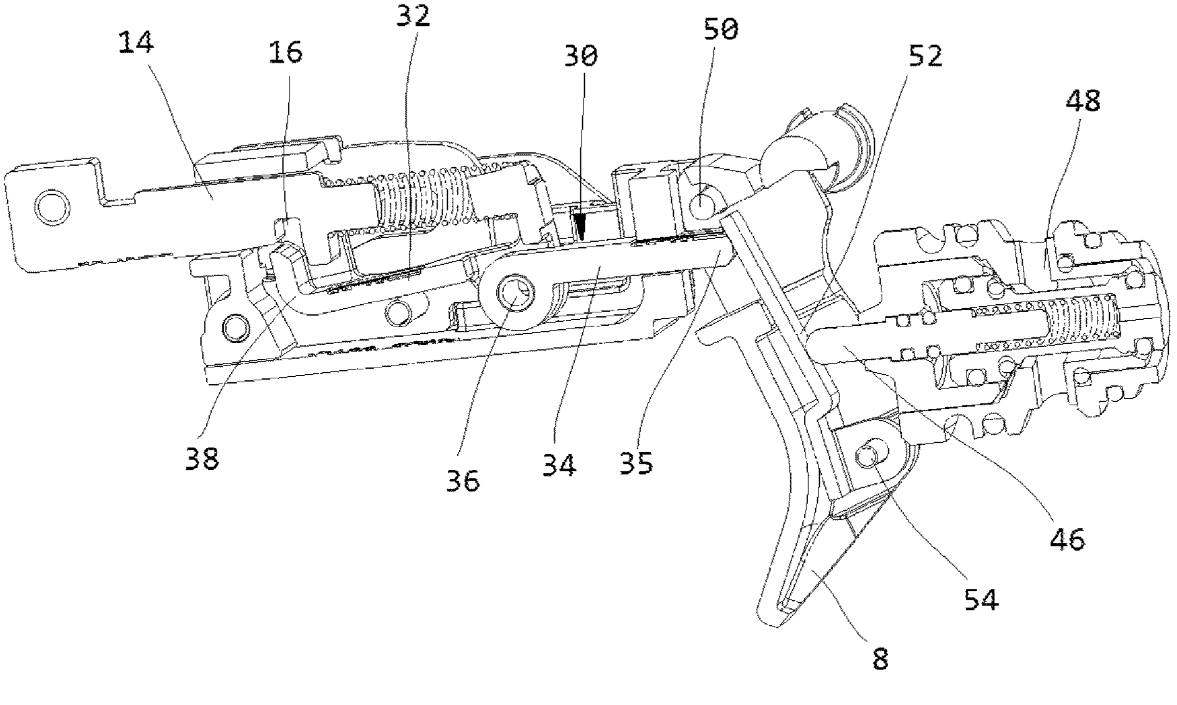

[FIG.9]
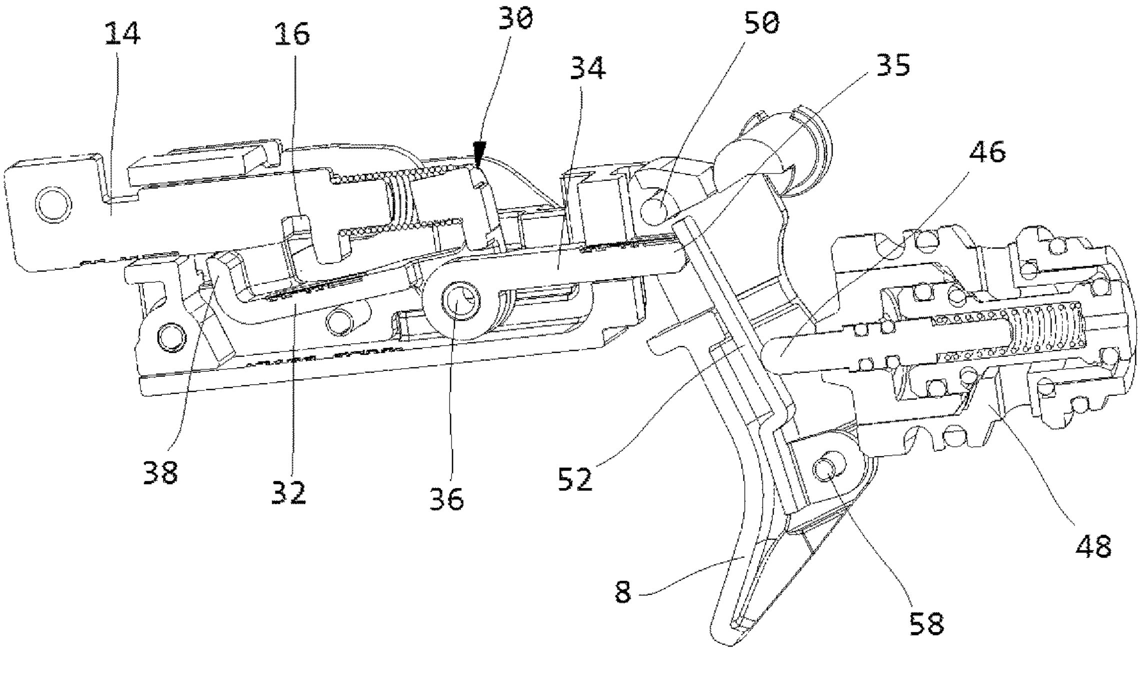

NAIL GUN HAVING ACCIDENTAL SHOOTING PREVENTION STRUCTURE

BACKGROUND OF THE DISCLOSURE

Field of the Disclosure

The present disclosure relates to a nail gun having an accidental shooting prevention structure, and more particularly, to a nail gun having an accidental shooting prevention structure which functions to control not to be shot when not loaded or continuously driven except when a nose of a contact member is pressed to a target object and, at the same time, a trigger is pulled.

Description of the Related Art

As is well known, a common type of nail gun is a pneumatic nail gun. A pneumatic nail gun is composed of a drive part composed of a piston and a cylinder inside a body, a handle configured vertically at a lower part of the body, a trigger for shooting nails configured to be pulled by an operator and located at the front of the handle, and a nail magazine configured at the lower part of the front end of the body to be parallel to the handle.

In such a nail gun, the piston in the drive part fires the nail forward due to air pressure so that the nail is compressed, when the trigger is pulled in a state where a launcher at the front end of the body is placed in a target area into which a nail is to be compressed.

However, such a conventional nail gun frequently causes accidents caused by workers' mistakes or external shocks. Unlike Taka, a nail gun often leads to a very serious life-threatening accident in case of an accidental accident, so a safety device for preventing misfire accidents is essential.

However, the conventional nail gun is not provided with a safety device. Considering the application of an accessory safety device, work efficiency can be greatly decreased if an operator has to perform manipulations several times to release the safety device.

SUMMARY OF THE DISCLOSURE

Therefore, the present invention has been made in view of the above problems, and it is one object of the present invention to provide a nail gun having an accidental shooting prevention structure which functions to control not to be shot when not loaded or continuously driven except when a nose of a contact member is pressed to a target object and, at the same time, a trigger is pulled.

In accordance with an aspect of the present invention, the above and other objects can be accomplished by the provision of a nail gun having an accidental shooting prevention structure, including: a body including a nail magazine disposed at a front lower part thereof; a handle disposed in a vertical direction at a rear lower part thereof; and a drive part, disposed thereinside, for shooting nails forward; a striking mechanism for striking a nail placed in a launching hole; a drive switch for activating the striking mechanism; a trigger pulled by an operator such that the drive switch can be operated; a contact member disposed on a support member disposed at a front lower part of the body and supported slidably by the support member and configured to contact a target object; a first safety bar vertically coupled to a rear end of the contact member; a second safety bar vertically coupled to a rear end of the first safety bar; a cam member whose front end is coupled with a rear end of the second safety bar to press the drive switch when a trigger is operated; and a sliding guider that guides forward and backward movement in a state in which the second safety bar and the cam member are coupled with each other.

Preferably, the nail gun having an accidental shooting prevention structure may further a first spring whose opposite ends are coupled to the support member and the first safety bar.

Preferably, the nail gun having an accidental shooting prevention structure may further include a second spring whose opposite ends are coupled to the second safety bar and a turning part disposed at a front end of the cam member.

Preferably, a pulling force of the trigger may be designed to be greater than a sum of elastic forces of the first spring and the second spring.

Preferably, a minimum elastic force of the second spring may be designed to be greater than a maximum elastic force of the first spring.

Preferably, when the contact member is pushed backward, and the trigger is pulled in a state in which the second safety bar is coupled with the cam member, the drive switch may activate the striking mechanism.

Preferably, when the trigger is pulled in a state in which a coupling between the second safety bar and the cam member is released, the drive switch may be not activated.

Preferably, the cam member may include: a turning part moving horizontally while a front end of the turning part turns up and down in a state guided by the sliding guider; and a horizontal moving part coupled to a rear end of the turning part by a first pivot to move horizontally, wherein a front end of the turning part is provided with an operation protrusion to be coupled to an operation groove that is provided at a lower end of the second safety bar.

Preferably, guide protrusions protruding outward may be formed on opposite side surfaces of a front end of the turning part.

Preferably, the sliding guider may include: a guide frame for accommodating the cam member into opposite sides thereof; and guide holes formed on opposite sides of the guide frame to limit a movement of the cam member, wherein the guide holes are formed in a stair shape wherein a lower position is formed at a front end of each of the guide holes and an upper position is formed at a rear end of the guide holes.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective transillumination view illustrating an appearance of a nail gun having an accidental shooting prevention structure according to an embodiment of the present disclosure;

FIG. 2 is a side transillumination view illustrating side constructions of a nail gun having an accidental shooting prevention structure according to an embodiment of the present disclosure;

FIG. 3 is a perspective view illustrating an assembled state of a contact element, first safety bar, and second safety bar included in a nail gun having an accidental shooting prevention structure according to an embodiment of the present disclosure;

FIG. 4 is a perspective view illustrating a sliding guide member included in a nail gun having an accidental shooting prevention structure according to an embodiment of the present disclosure;

FIG. 5 is a perspective view illustrating a cam member included in a nail gun having an accidental shooting prevention structure according to an embodiment of the present disclosure;

FIG. 6 is a side transillumination view illustrating a state in which a trigger of a nail gun having an accidental shooting prevention structure according to an embodiment of the present disclosure is pulled when not loaded;

FIG. 7 is a side transillumination view illustrating a state in which a nail gun having an accidental shooting prevention structure according to an embodiment of the present disclosure is in contact with a target object and a trigger is pulled;

FIG. 8 is a view illustrating a coupling state between a second safety bar and a cam member that are included in a nail gun having an accidental shooting prevention structure according to an embodiment of the present disclosure; and FIG. 9 is a view illustrating a state in which coupling between a second safety bar and cam member that are included in a nail gun having an accidental shooting prevention structure according to an embodiment of the present disclosure is released.

DETAILED DESCRIPTION OF THE DISCLOSURE

Hereinafter, the present disclosure is described in detail with reference to the accompanying drawings.

FIG. 1 is a perspective transillumination view illustrating an appearance of a nail gun having an accidental shooting prevention structure according to an embodiment of the present disclosure, FIG. 2 is a side transillumination view illustrating side constructions of a nail gun having an accidental shooting prevention structure according to an embodiment of the present disclosure, FIG. 3 is a perspective view illustrating an assembled state of a front contact, first safety bar, and second safety bar included in a nail gun having an accidental shooting prevention structure according to an embodiment of the present disclosure, FIG. 4 is a perspective view illustrating a sliding guide member included in a nail gun having an accidental shooting prevention structure according to an embodiment of the present disclosure, and FIG. 5 is a perspective view illustrating a cam member included in a nail gun having an accidental shooting prevention structure according to an embodiment of the present disclosure.

Referring to the drawings, a nail gun 2 according to an embodiment of the present disclosure has an accidental shooting prevention structure that allows to control not to be shot when not loaded or continuously driven except when a nose of a contact member is pressed to a target object and, at the same time, a trigger is pulled.

That is, in the case of the nail gun 2 having an accidental shooting prevention structure according to an embodiment of the present disclosure, a safety bar pushed backward by pressing a nose of a contact member to a target object presses a plunger so that a nail is shot, the safety bar is positioned in the front due to a non-contact of the contact member when not loaded, and coupling between a second safety bar and a cam member is released when continuously driven or when the plunger is pressed by an external impact, thereby preventing a shooting.

More particularly, the nail gun 2 having an accidental shooting prevention structure according to an embodiment of the present disclosure includes a body (not shown) having a general appearance. The body includes a nail magazine (not shown) disposed at a front lower part thereof, a handle (not shown) disposed in a vertical direction at a rear lower part thereof, a drive part, disposed thereinside, for shooting nails forward (not shown), and a striking mechanism (not shown) for striking nails placed in a launching hole. Detailed descriptions of such general constructions of the nail gun are omitted.

The nail gun 2 having an accidental shooting prevention structure according to an embodiment of the present disclosure includes a drive switch 48 for activating the striking mechanism. The drive switch 48 is disposed at a rear end of the body. A plunger 46 protrudes from the center of a front end of the drive switch 48 and, when the plunger 46 is pressed by a certain length, the drive switch 48 is activated.

In addition, in the nail gun 2 having an accidental shooting prevention structure according to an embodiment of the present disclosure, the trigger 8, which is pulled by an operator such that the drive switch 48 can be operated, is pivotably fixed to the body by a second pivot 50, and a trigger arm 52 rotatably fixed by a third pivot 54 is fixed to an inside of the trigger 8.

Meanwhile, a contact member 6 that is disposed on a support member 4 disposed at a front lower part of the body, is supported slidably by the support member 4 and contacts a target object; a first safety bar 12 vertically coupled to a rear end of the contact member 6; and a second safety bar 14 vertically coupled to a rear end of the first safety bar 12 are included.

In addition, a cam member 30 whose front end is coupled with a rear end of the second safety bar 14 to press the drive switch 48 when the trigger is operated; and a sliding guider 20 that guides forward and backward movement in a state in which the second safety bar 14 and the cam member 30 are coupled with each other.

In the nail gun 2 having an accidental shooting prevention structure according to an embodiment of the present disclosure, the drive switch 48 is activated only when all of a first condition in which the contact member 6 is pressed in contact with a target object, a second condition in which the second safety bar 14 and the cam member 30 are coupled, and a third condition in which an operator pulls the trigger 8 are satisfied.

That is, when the contact member 6 is pushed backward, and the trigger 8 is pulled in a state in which the second safety bar 14 is coupled with the cam member 30, the drive switch 48 activates the striking mechanism.

On the other hand, when the contact member 6 is not pushed backward due to no load or the coupling between the second safety bar 14 and the cam member 30 is released, the drive switch 48 is not activated even if the trigger 8 is pulled.

Meanwhile, a first spring 42 having both ends coupled to the support member 4 and the first safety bar 12; and a second spring 44 having both ends coupled to the second safety bar 14 and a turning part 32 disposed at a front end of the cam member 30 are provided.

Here, a pulling force of the trigger 8 is designed to be greater than the sum of elastic forces of the first spring 42 and the second spring 44, and a minimum elastic force of the second spring 44 is designed to be greater than a maximum elastic force of the first spring 42.

In addition, the cam member 30 includes the turning part 32 moving horizontally while a front end thereof turns up and down in a state guided by the sliding guider 20; and a horizontal moving part 34 coupled to a rear end of the turning part 32 by the first pivot 36 to move horizontally, wherein a front end of the turning part 32 is provided with an operation protrusion 38 to be coupled to an operation groove 16 that is provided at a lower end of the second safety bar 14.

Here, guide protrusions 40 protruding outward are formed on opposite side surfaces of a front end of the turning part 32.

Meanwhile, the sliding guider 20 includes a guide frame 22 for accommodating the cam member 30 into opposite sides thereof; and guide holes 24 formed on opposite sides of the guide frame 22 to limit the movement of the cam member 30, wherein the guide holes 24 are formed in a stair shape wherein a lower position **26*b* is formed at a front end of each of the guide holes 24 and an upper position 26*a*** is formed at a rear end thereof.

The functions and actions of the nail gun with an accidental shooting prevention structure according to an embodiment of the present disclosure having the above-described constructions are described in detail with reference to the accompanying drawings.

FIG. 6 is a side transillumination view illustrating a state in which a trigger of a nail gun having an accidental shooting prevention structure according to an embodiment of the present disclosure is pulled when not loaded.

First, in the nail gun 2 having an accidental shooting prevention structure according to an embodiment of the present disclosure, a position where the trigger arm 52 contacts the plunger 46 acts as a fulcrum to push the horizontal moving part 34 forward when an operator pulls the trigger 8 in an unloaded state, i.e. in a state in which the contact member 6 is brought into contact with a target to be nailed and the nail gun 2 is not pressed forward.

Here, since the minimum elastic force of the second spring 44 is greater than the maximum elastic force of the first spring 42, the coupling of the operation protrusion 38 to the operation groove 16 is released as shown in FIG. 9 while the elastic force of the second spring 44 compresses the first spring 42 forward and a front end of the turning part 32 positioned in front of the cam member 30 pivots downward along the guide holes 24 even if an operator pulls the trigger 8 when not loaded.

When the coupling of the operation protrusion 38 is released, the horizontal moving part 34 is prevented from moving backward so that a fulcrum 35 of the horizontal moving part 34 cannot push an upper end of the trigger arm 52 backward.

Accordingly, the trigger arm 52 cannot press the plunger 46 backward so that the drive switch 48 is not activated.

Here, when an operator releases pulling of the trigger 8, the components compressed by restoring force of the first spring 42 and the second spring 44 move backward. Here, the turning part 32 and the horizontal moving part 34 move backward along the guide holes 24 of the sliding guider 20 due to the restoring force of the second spring 44, so that the operation protrusion 38 of the turning part 32 and the operation groove 16 of the second safety bar 14 are coupled with each other as shown in FIG. 2 or 8.

FIG. 7 is a side transillumination view illustrating a state in which a nail gun having an accidental shooting prevention structure according to an embodiment of the present disclosure is in contact with a target object and a trigger is pulled, FIG. 8 is a view illustrating a coupling state between a second safety bar and a cam member that are included in a nail gun having an accidental shooting prevention structure according to an embodiment of the present disclosure, and FIG. 9 is a view illustrating a state in which coupling between a second safety bar and cam member that are included in a nail gun having an accidental shooting prevention structure according to an embodiment of the present disclosure is released.

First, as described above, since the turning part 32 and the horizontal moving part 34 of the nail gun 2 having an accidental shooting prevention structure according to an embodiment of the present disclosure moves backward along the guide holes 24 of the sliding guider 20 by the elastic force of the first spring 42 and the second spring 44 as shown in FIG. 2 or 8 in an initial state in which the contact member 6 and the trigger 8 are not manipulated by an operator so that the coupled state between the operation protrusion 38 of the turning part 32 and the operation groove 16 of the second safety bar 14 is maintained.

In the state, when the operator contacts the contact member 6 with an object to be nailed and presses the nail gun 2 forward, the components move backward in the state in which the operation protrusion 38 of the turning part 32 and the operation groove 16 of the second safety bar 14 are coupled with each other.

Accordingly, the horizontal moving part 34 pushes the trigger arm 52 in a direction of the drive switch 48. However, by such a movement, the trigger arm 52 cannot operate the plunger 46 protruding from the drive switch 48.

In the state, when the operator pulls the trigger 8, an end of the horizontal moving part 34 in contact with an upper end of the trigger arm 52 acts as the fulcrum 35 in a state in which the trigger arm 52 is in contact with the plunger 46, so that the trigger arm 52 presses the plunger 46 to activate the drive switch 48.

Here, in consideration of the fact that there is a work defect or a high frequency of safety accidents when continuously nailed, the nail gun 2 having an accidental shooting prevention structure according to an embodiment of the present disclosure can structurally prevent continuous nailing.

That is, nailing is performed when an operator contacts the contact member 6 with an object to be nailed, presses the nail gun 2 forward, and pulls the trigger 8 and, at this time, the nail gun 2 retreats backward due to repulsive force after the nailing, so that, when the contact member 6 is separated from the shot object, the coupling of the operation protrusion 38 to the operation groove 16 is released as shown in FIG. 9 while the elastic force of the second spring 44 compresses the first spring 42 forward and the front end of the turning part 32 positioned in the front of the cam member 30 rotates downward along the guide holes 24.

Therefore, the nail gun 2 having an accidental shooting prevention structure according to an embodiment of the present disclosure can prevent continuous nailing, so that the occurrence of safety accidents can be reduced, and defects due to deterioration of the nail and the magazine or the launching hole and the drive part can be prevented.

As apparent from the above description, a nail gun having an accidental shooting prevention structure according to the present disclosure can compress nails only when all of a first condition in which a contact member is pressed in contact with a target object, a second condition in which a second safety bar and a cam member are coupled, and a third condition in which an operator pulls a trigger are satisfied. In addition, since operator's actions to meet the three conditions are not complicated, work efficiency is high and continuous nailing can be prevented so that the occurrence of safety accidents can be reduced, and defects due to deterioration of a nail and a magazine or a launching hole and a drive part can be prevented.

Meanwhile, the nail gun having an accidental shooting prevention structure according to an embodiment of the present disclosure is not limited to the above embodiment and may be variously modified without departing from the technical gist thereof.

[Description of Symbols]

| | |
|---|---|
| 2: nail gun, | 4: support member, |
| 6: contact member, | 8: trigger, |
| 10: safety lever, | 12: first safety bar, |
| 14: second safety bar, | 15: bolt, |
| 16: operation groove, | 20: sliding guider, |
| 22: guide frame, | 24: guide hole, |
| 26a, 26b: upper and lower positions, | 30: cam member, |
| 32: turning part, | 34: horizontal moving |
| 35: fulcrum, | 36: first pivot, |
| 38: operation protrusion, | 40: guide protrusion, |
| 42, 44: first and second springs, | 46: plunger, |
| 48: drive switch, | 50: second pivot, |
| 52: trigger arm, | 54: third pivot. |

What is claimed is:

1. A nail gun having an accidental shooting prevention structure, comprising:

a body comprising a nail magazine disposed at a front lower part thereof; a handle disposed in a vertical direction at a rear lower part thereof; and a drive part, disposed thereinside, for shooting nails forward;

a striking mechanism for striking a nail placed in a launching hole;

a drive switch for activating the striking mechanism;

a trigger pulled by an operator such that the drive switch can be operated;

a contact member disposed on a support member disposed at a front lower part of the body and supported slidably by the support member and configured to contact a target object;

a first safety bar vertically coupled to a rear end of the contact member;

a second safety bar vertically coupled to a rear end of the first safety bar;

a cam member whose front end is coupled with a rear end of the second safety bar to press the drive switch when a trigger is operated; and a sliding guider that guides forward and backward movement in a state in which the second safety bar and the cam member are coupled with each other.

2. The nail gun according to claim 1, further comprising a first spring whose opposite ends are coupled to the support member and the first safety bar.

3. The nail gun according to claim 2, wherein a minimum elastic force of the second spring is designed to be greater than a maximum elastic force of the first spring.

4. The nail gun according to claim 1, further comprising a second spring whose opposite ends are coupled to the second safety bar and a turning part disposed at a front end of the cam member.

5. The nail gun according to claim 1, wherein a pulling force of the trigger is designed to be greater than a sum of elastic forces of the first spring and the second spring.

6. The nail gun according to claim 1, wherein when the contact member is pushed backward, and the trigger is pulled in a state in which the second safety bar is coupled with the cam member, the drive switch activates the striking mechanism.

7. The nail gun according to claim 1, wherein when the trigger is pulled in a state in which a coupling between the second safety bar and the cam member is released, the drive switch is not activated.

8. The nail gun according to claim 1, wherein the cam member comprises:

a turning part moving horizontally while a front end of the turning part turns up and down in a state guided by the sliding guider; and a horizontal moving part coupled to a rear end of the turning part by a first pivot to move horizontally, wherein a front end of the turning part is provided with an operation protrusion to be coupled to an operation groove that is provided at a lower end of the second safety bar.

9. The nail gun according to claim 8, wherein guide protrusions protruding outward are formed on opposite side surfaces of a front end of the turning part.

10. The nail gun according to claim 1, wherein the sliding guider comprises:

a guide frame for accommodating the cam member into opposite sides thereof; and guide holes formed on opposite sides of the guide frame to limit a movement of the cam member, wherein the guide holes are formed in a stair shape wherein a lower position is formed at a front end of each of the guide holes and an upper position is formed at a rear end of the guide holes.

* * * * *